United States Patent Office 2,936,286

Patented May 10, 1960

2,936,286

PRODUCTION OF ACICULAR IRON PARTICLES

George Feick, Needham, and Harold F. Stedman, West Roxbury, Mass., assignors, by mesne assignments, to Dictaphone Corporation, Bridgeport, Conn., a corporation of New York No Drawing. Application July 25, 1955 Serial No. 524,308

6 Claims. (Cl. 252—62.5)

This invention relates to the production of finely divided acicular magnetizable iron particles, as well as to magnetic recording media, particularly sound recording media, containing such particles.

One type of magnetic sound recording medium that is now widely used commercially comprises a thin flexible base or carrier made of a non-magnetic material such as paper, plastic, or the like, having a coating thereon which contains a ferromagnetic material in finely divided form. Such magnetic media can be made in any of various physical forms such as sheets, tapes, belts, ribbons, etc. The ferromagnetic material that is generally used in the magnetic coatings of such media is gamma ferric oxide.

It is also known that magnetic media having improved magnetic properties for sound recording purposes can be obtained by utilizing as the magnetic material a ferromagnetic iron oxide having needle-shaped particles. Such acicular iron oxides are extensively used commercially and have been shown to give exceptionally good results when properly incorporated in sound recording media.

It is further known that metallic iron is much more strongly magnetic than gamma iron oxide. For instance, the saturation induction ($B_s$) for metallic iron has been reported to be 21,500 gausses while that for gamma iron oxide may be estimated as about 5000 from the published data. Hence from a theoretical standpoint it should be possible to achieve superior magnetic properties by utilizing elemental iron instead of iron oxide, provided that iron particles can be produced having the desired acicular configuration and relatively small size, preferably a particle size such that each particle contains only a single magnetic domain. However, so far as we are aware, iron powders of this type have not previously been made.

It is accordingly an object of the present invention to produce iron powder in the form of acicular particles having a length of the order of 0.1 to 1 micron. It is another object of the invention to provide a magnetic sound recording medium wherein the magnetic material is an iron powder of this type. It is still another object of the invention to provide a magnetic medium having superior magnetic properties for sound recording purposes and having a relatively high output. It is a still further object of the invention to provide a method of making such an iron powder which uses a relatively inexpensive raw material and readily available reagents. It is still another object of the invention to produce iron powder in the form of acicular particles containing only a single magnetic domain. Other objects of the invention will be in part obvious and in part pointed out hereafter.

The preferred starting material for use in making the acicular iron particles of the present invention is an alpha ferric oxide monohydrate pigment having acicular particles, although other acicular iron oxide pigments may be used. This pigment is extensively used commercially and may be made for example in accordance with the disclosure of Penniman et al. Patent 1,368,748. In one of its broader aspects the method of the present invention comprises reducing this alpha ferric oxide pigment under conditions that are so controlled as to avoid destruction of the acicular form of the pigment particles and thereby obtaining acicular iron. It has been found that reduction of the iron oxide pigment under most conditions produces a more or less complete disintegration of the oxide particles or agglomeration of the product particles and that it is necessary to depart substantially from conventional reduction techniques in order to achieve elemental iron particles of the desired configuration and size.

In a somewhat narrower aspect the method of the invention comprises a preliminary heat treatment of the alpha ferric oxide pigment at a temperature above about 500° C., followed by a low temperature reduction of the pigment with a reducing agent selected from the group consisting of the alkali metals and their hydrides. The precise role played by the preliminary heat treatment step of the present process is not fully understood. In cases where the starting material in an alpha ferric oxide monohydrate, water is removed in the heat treatment step. However, dehydration is not the only change that takes place during heat treatment, since dehydration can be effected at a lower temperature and if so effected, does not permit reduction of the oxide by conventional reduction procedure to give the desired acicular particles. There is some indication that the heat treatment produces a densification of the ferric oxide particles which protects them against disintegration during the subsequent reduction step. In any event, it has been found that suitable heat treatment of the oxide increases the proportion of acicular particles in the product and minimizes the proportion of less desirable non-acicular particles. The heat treatment step is therefore a desirable preliminary to reduction if a satisfactory reduced product is to be obtained.

The heat treatment may be carried out in air at any temperature between about 500° C. and the temperature at which the acicular oxide particles agglomerate or lose their acicular shape. The time of heating is a function of temperature, that is to say, at lower temperatures, longer heating periods should be used and at higher temperature shorter periods may be used. Thus at a temperature of 500° C. a heating time of 3 hours would be suitable; whereas at 1000° C. 1 hour or less is ordinarily sufficient. The preferred heating schedule is 750° to 900° C. for a period of about 2 hours. After heating, the iron oxide is cooled in air and then reduced to elemental iron.

It has been found important in carrying out the reduction step of the present process to use a relatively low reduction temperature in order to avoid disintegration or agglomeration of the iron particles. Thus the temperature during the reduction step should not be higher than about 300° C. and is preferably 175° to 200° C. As indicated above the reducing agent used is desirably an alkali metal or alkali metal hydride. The reduction can be conveniently carried out by using a low melting point inorganic compound or mixture of inorganic compounds as a reaction medium. Suitable mixtures are for example sodium hydroxide-potassium hydroxide, sodium iodide-potassium iodide, sodium iodide-sodium hydroxide, and potassium iodide-potassium hydroxide. It has been found that a slight stoichiometrical excess of the reducing agent, say 5 to 10% excess, should be used, although a larger excess can be used if desired.

The reaction is desirably carried out by adding the oxide and reducing agent to the molten bath in small increments as described more fully in the specific example given hereafter. The oxide and reducing agent are added in such quantities that the molten bath always contains an excess of the reducing agent. The reaction proceeds rapidly to produce the desired finely divided acicular iron particles.

It has been found that the iron powder thus produced is highly pyrophoric, and hence certain precautions must be taken in recovering it from the reaction mixture. An initial separation of the iron powder from the inorganic salts can be easily effected by dissolving the reaction mixture in water, filtering the iron powder from the resulting suspension, and washing it free of soluble material with water. If the iron powder is to be recovered as a dry product, drying should be carried out in a non-oxidizing atmosphere such as nitrogen or hydrogen. Alternatively the tendency of the particles to oxidize in air can be reduced, if desired, by applying a flash plating of copper thereto or by a phosphate or nitrite treatment prior to drying.

On the other hand, where the iron particles are to be used in a sound recording medium, the problem created by their pyrophoric character can be circumvented entirely by incorporating the particles in the magnetic medium without drying them. For example, the water-wet filtered iron particles can be mixed with a water-miscible organic solvent and successively washed with the same or different solvents until they have been completely de-watered. The solvent-wet iron particles can then be dispersed in a resin solution to form a dope or dispersion of the proper type to be applied to a base material to form a magnetic sound recording medium. This procedure is preferred in cases where the iron powder is to be used in making a magnetic sound recording medium since it avoids substantially completely the difficulties due to the tendency of the iron powder to oxidize.

In order to point out more fully the nature of the present invention, the following specific example is given of a preferred embodiment of the method of the invention: A quantity of alphaferric oxide monohydrate having acicular particles was heated at 750° C. for 2 hours and then cooled to room temperature. A molten reaction bath was prepared by mixing and heating in a nickel beaker 954 grams of 85% potassium hydroxide (KOH) pellets and 457 grams of technical flake sodium hydroxide (NaOH). The mixture was carefully dehydrated to remove all traces of water before the reactants were added thereto. Thus it was initially heated to and maintained at 425° C. until effervescence due to evaporation of water ceased. Thereafter it was cooled to just above its freezing point and small quantities of sodium hydride added thereto until evolution of gas due to the presence of water ceased. About 32 grams of sodium hydride was required to react with the residual water in the hydroxide mixture.

Thereafter, small portions, say 5 to 10 grams, of sodium hydride and the heat-treated oxide were alternately added to the molten bath with continuous agitation, while maintaining the bath at a temperature of 175° C. to 200° C. The quantities added were such that the sodium hydride was always present in excess. A total quantity of 112.1 grams of sodium hydride and 180 grams of the heat-treated oxide were added.

When the reaction was complete the bath was cooled to just below its freezing point and 8 to 10 liters of hot water was used to dissolve the soluble components of the reaction mixture. The iron powder was permitted to settle and the supernatant liquid decanted therefrom. The powder was then washed with an additional 3 liters of water and filtered. The water-wet powder was washed successively with separate portions of ethanol, acetone, ether and toluol to give a product containing about 55% solids. This product because of its large surface area was relatively dry in appearance even though it contained some 45% toluol. Electron photomicrographs of the product showed that it was composed of acicular particles of about 0.1 to 1.5 microns in length. The length-towidth ratio was at least 3:1 and for most of the particles ranged from 5:1 to 10:1.

The powder as thus prepared was used in making a sound recording tape in the following manner: 209 grams of the toluol-wet iron powder was mixed with 30.75 grams of a high-styrene copolymer of styrene and butadiene (Pliolite S-5B); 3.38 grams of 1-hydroxyethyl-2-heptadecenyl-glyoxalidine (Amine 220), 0.38 gram of stearic acid and 35.5 grams of toluene. This mixture was ball-milled for 20 hours to form a uniform dispersion of the iron powder. Thereafter it was applied to a 5-mil strip of cellulose acetate butyrate film to form a magnetic coating having a dry thickness of about 1.1 mils. The resulting tape was tested to determine its sound recording properties and was found to be an acceptable sound recording medium.

It will of course be understood that the foregoing example is illustrative only and that numerous changes can be made in the ingredients, proportions and conditions set forth without departing from the spirit of the invention. The particular composition of the molten inorganic bath does not appear to be critical provided that it is stable at the reaction temperature used and is non-reactive toward the reducing agent and iron oxide. As indicated above, the alkali metals such as metallic sodium can be substituted for the hydride if desired. The amount of reactive ingredients added to the bath does not appear to be particularly critical so long as the proper relation between added oxide and reducing agent is maintained as described above. Conveniently the reaction mixture at the end of the reaction period may contain one unit weight of iron per 10 unit weights of molten reaction medium.

Numerous methods of preparing magnetic pigment dispersions for application to tapes and sheets to form magnetic recording media are known in the art. Such known methods may be substituted, if desired, for the illustrative procedure described above. Other modifications within the scope of the invention will be apparent to those skilled in the art.

We claim:

1. The method of making acicular iron particles which comprises heating acicular iron oxide particles to a temperature of 500° to 1000° C., reducing the heat-treated iron oxide in a molten inorganic reaction medium at a temperature below 300° C. with a reducing agent which is an alkali metal hydride to form a reaction mixture containing acicular iron particles, and recovering said acicular iron particles from said reaction mixture.

2. The method of making acicular iron particles which comprises heating acicular ferric oxide particles to a temperature of 500° to 1000° C., reducing the heat-treated ferric oxide in a molten mixture of alkali metal hydroxides at a temperature of 175° to 200° C. with a reducing agent which is an alkali metal hydride to form a reaction mixture containing acicular iron particles, and recovering said acicular iron particles from said reaction mixture.

3. The method of making acicular iron particles which comprises heating acicular iron oxide particles to a temperature of 500° to 1000° C., reducing the heat-treated iron oxide in a molten mixture of sodium and potassium hydroxides in the presence of sodium hydride to form a reaction mixture containing acicular iron particles, and recovering said acicular iron particles from said reaction mixture.

4. The method of making acicular iron particles which comprises heating acicular ferric oxide particles at a temperature of 750° to 900° C. reducing the heat-treated iron oxide in a molten inorganic reaction medium with a reducing agent which is an alkali metal hydride at a temperature below 300° C. to form a reaction mixture containing acicular iron particles, and recovering said acicular iron particles from said reaction mixture.

5. The method of making acicular iron particles which comprises heating acicular ferric oxide particles to a temperature of 500° to 1000° C., reducing the heat-treated ferric oxide in a molten mixture of alkali metal hydroxides at a temperature of 175° to 200° C. with a reducing agent which is an alkali metal hydride to form a reaction mixture containing acicular iron particles, adding said reaction mixture to water to form an aqueous suspension of said acicular iron, separating said acicular iron particles from said suspension, and de-watering said iron particles.

6. The method of making acicular iron particles which comprises heating acicular iron oxide monohydrate particles at a temperature of 750° to 900° C. for at least about one hour, reducing the heat-treated iron oxide with sodium hydride in a molten mixture of sodium and potassium hydroxides at a temperature of 175° to 200° C. to form acicular iron particles, adding the reaction mixture to water to form an aqueous suspension of said iron particles, separating said iron particles from said suspension, and de-watering said iron particles.

References Cited in the file of this patent

UNITED STATES PATENTS

| | | |
|---|---|---|
| 1,982,689 | Polydoroff | Dec. 4, 1934 |
| 2,038,402 | Alexander | Apr. 21, 1936 |
| 2,377,876 | Gilbert | June 12, 1945 |
| 2,550,803 | Goddard | May 1, 1951 |
| 2,694,656 | Camras | Nov. 16, 1954 |
| 2,783,207 | Tombs | Feb. 26, 1957 |